US011388021B2

(12) United States Patent
Restrepo Conde et al.

(10) Patent No.: US 11,388,021 B2
(45) Date of Patent: Jul. 12, 2022

(54) INTELLIGENT VIRTUAL ASSISTANT NOTIFICATION REROUTING

(71) Applicant: International Business Machines Corporation, Armonk, NY (US)

(72) Inventors: Melissa Restrepo Conde, Raleigh, NC (US); Trudy L. Hewitt, Cary, NC (US); Jeremy R. Fox, Georgetown, TX (US); Jonathan M. Smith, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 376 days.

(21) Appl. No.: 16/519,056

(22) Filed: Jul. 23, 2019

(65) Prior Publication Data
US 2021/0028955 A1    Jan. 28, 2021

(51) Int. Cl.
*H04L 12/28* (2006.01)
*H04L 45/00* (2022.01)
*H04W 40/20* (2009.01)

(52) U.S. Cl.
CPC ...... *H04L 12/2838* (2013.01); *H04L 12/2829* (2013.01); *H04L 45/22* (2013.01); *H04W 40/20* (2013.01)

(58) Field of Classification Search
CPC . H04L 12/2838; H04L 45/22; H04L 12/2809; H04L 45/122; H04W 40/20
See application file for complete search history.

(56) References Cited

U.S. PATENT DOCUMENTS

| 9,271,111 | B2 | 2/2016 | Blanksteen |
| 10,020,848 | B2 | 7/2018 | Augusto Di Grandi Nery et al. |
| 2002/0087647 | A1 | 7/2002 | Quine et al. |
| 2004/0135816 | A1 | 7/2004 | Schwartz et al. |
| 2009/0271486 | A1 | 10/2009 | Ligh et al. |
| 2014/0244266 | A1 | 8/2014 | Brown et al. |
| 2014/0245140 | A1 | 8/2014 | Brown et al. |
| 2016/0028670 | A1 | 1/2016 | Lott et al. |
| 2016/0259308 | A1 | 9/2016 | Fadell et al. |
| 2017/0236512 | A1 | 8/2017 | Williams et al. |
| 2018/0206083 | A1* | 7/2018 | Kumar ............... H04W 4/025 |
| 2018/0373398 | A1 | 12/2018 | Seixeiro et al. |

OTHER PUBLICATIONS

Santos et al., "Intelligent personal assistants based on internet of things approaches", IEEE Systems Journal, 12(2), pp. 1793-1802, 2018.

* cited by examiner

*Primary Examiner* — Ashley Shivers
(74) *Attorney, Agent, or Firm* — Cantor Colburn LLP; Tihon Poltavets

(57) ABSTRACT

Aspects of the invention provide intelligent virtual assistant (IVA) notification rerouting including receiving a message at an electronic IVA and determining a recipient of the message by analyzing content of the message. A current location of the recipient is identified. A device and a delivery method are selected based at least in part on the current location of the recipient and a location of the device. The selected device is instructed to output the message to the recipient using the delivery method.

18 Claims, 6 Drawing Sheets

INTELLIGENT VIRTUAL ASSISTANT NOTIFICATION REROUTING

BACKGROUND

The present invention generally relates to intelligent virtual assistant (IVA) notification rerouting, and more specifically, to electronic IVA notification rerouting to an Internet of things (IoT) device to facilitate proper message delivery.

An intelligent virtual assistant (IVA) is a software agent, or application, that can perform tasks for an individual based for example, on verbal commands. Some IVAs are able to interpret human speech and respond via synthesized voices. Users can ask their IVAs questions, control home automation devices and media playback via voice, and manage other basic tasks such as email, to-do lists, and calendars with verbal commands. IVAs can also send alerts to other devices to direct them to enter a specified state and can send alerts, or notifications, to the users via, for example a speaker. It is common for multiple users, such as an entire household, to share a single standalone IVA that is integrated into one or more smart speakers. Currently, when an alert is received by the standalone IVA, the delivery of the message does not take into account the intended audience which may not include all of the multiple users sharing the IVA. Thus, a message for one person may needlessly disturb an entire household. In addition, an IVA may be able to deliver a notification at a specified time but have no assurance that the message was correctly delivered and received, or that an action was taken in response to the message.

SUMMARY

Embodiments of the present invention provide intelligent virtual assistant (IVA) notification rerouting. A non-limiting example computer-implemented method includes receiving a message at an electronic IVA and determining a recipient of the message by analyzing content of the message. A current location of the recipient is identified. A device and a delivery method are selected based at least in part on the current location of the recipient and a location of the device. The selected device is instructed to output the message to the recipient using the delivery method.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
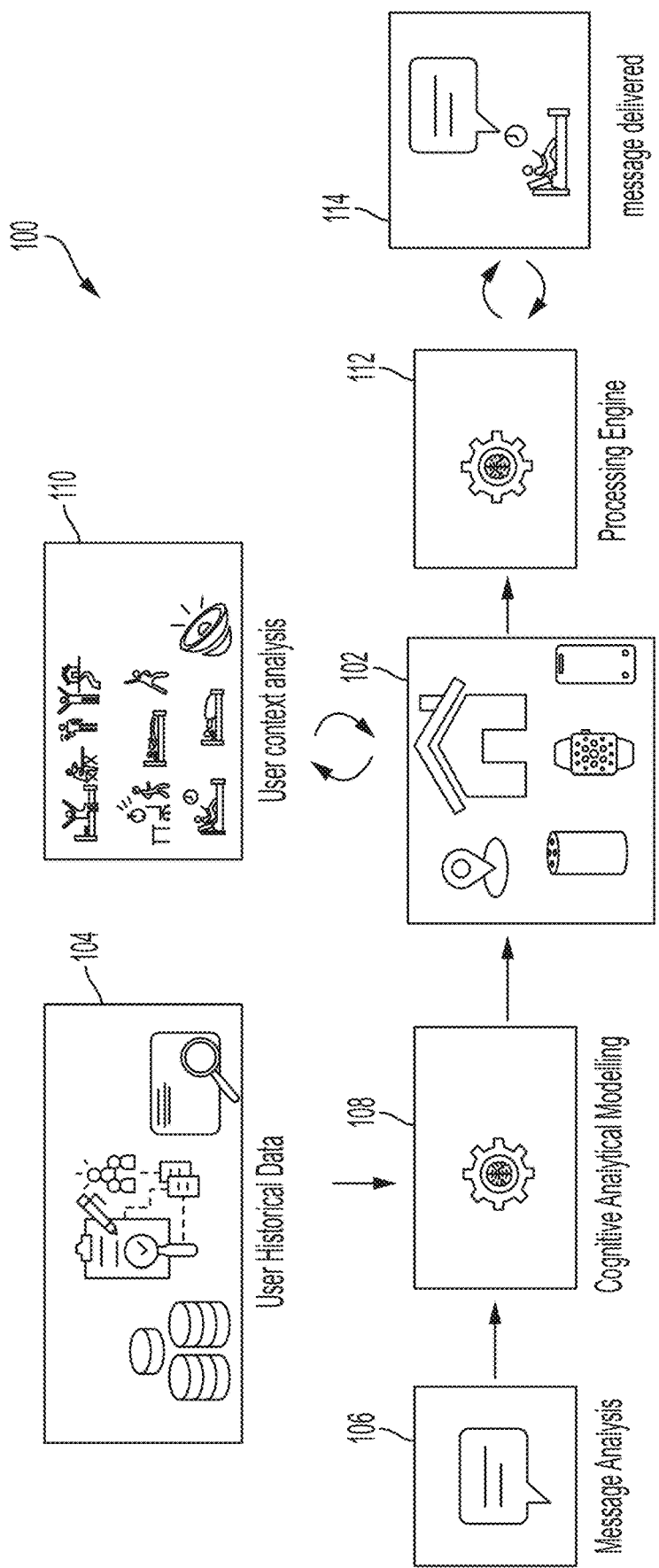
FIG. 1 illustrates a block diagram of components of intelligent virtual assistant (IVA) notification rerouting in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention provide intelligent virtual assistant (IVA) notification rerouting to an Internet of things (IoT) device to facilitate proper message delivery. Often, a common IVA is shared with an entire household or with multiple users, and not every announcement or message from the IVA is relevant to all of the users sharing the IVA. One or more embodiments of the present invention determine who within a household or user group would most likely want to receive the notification. Once the user(s) is determined, an IoT device that is in closest proximity to that user and/or aligned with an activity that the user is doing is selected for providing the notification to the user.

In accordance with one or more embodiments of the present invention, a notification received at an IVA is routed in a network of multiple IoT devices to a selected IoT device. The notification can be deciphered, or analyzed, to identify a specific user that the notification is designated for, an action associated with the notification, and a time frame for the notification. Responsive to deciphering the notification, a location of the specific user is identified. In addition, an IoT device that is closest to the specific user is identified. The IoT device can also be identified based on a set of parameters such as, but not limited to time of day and environmental parameters such as surrounding volume levels. The identified IoT device is instructed to output (e.g., display, audibly play the notification, and/or generate a haptic motion) within the time frame for the notification.

As used herein the terms "notification" and "alert" are used interchangeably to refer to a type of message that is broadcast when it is output by a device. The broadcast may include presenting the contents of the message on a screen of a computer device, outputting an audio message from a speaker of the device, and/or causing a haptic motion (e.g., a vibration). Examples of notifications include but are not limited to: a notification that someone is at the door; an advertisement that a product is on sale; and a reminder of an upcoming meeting.

As used herein the term "intelligent virtual assistant" or "IVA" refers to a virtual assistant that is implemented by a computer. Any commercially available IVA that can communicate with an IoT network can be utilized by one or more embodiments of the present invention. Examples of IVAs that may be utilized include but are not limited to: Alexa® executing on Amazon Echo® Siri® executing on an iPhone® or HomePod™ from Apple, Inc.; and Google Assistant™ executing on Google Home™.

As used herein, the term "IoT device" refers to any device that can communicate with other devices via an IoT network. Examples of IoT devices that may be connected via an IoT network include but are not limited to: IVAs; sensors; thermostat controls; door lock controls; smoke detectors; cameras; cellular telephones; head phones; smart watches; and lap top computers. Any of these IoT devices can send a notification to the IVA. Notifications can also be received from applications or devices that are outside of the IoT network.

Users that are in proximity to an IVA may be an ad-hoc group of users that is determined each time that a notification is received or on a periodic basis. Alternatively, the users that are in proximity to the IVA may also be a defined group such as household members that have registered with the IVA.

In accordance with one or more embodiments of the present invention, the content of a message and information about potential message recipients are analyzed to determine a recipient(s) of the message and to select an IoT to deliver the message to the recipient. The IoT device can be selected based on factors such as, but not limited to: whether the message is to be repeated; whether the message is to be simultaneously output on multiple IoT devices; who the recipient(s) are; how many recipients there are; a sequence of people getting the message; who is detected to be within a house (or other physical or geographic boundary); and where in the house the recipients are located.

One or more embodiments of the present invention provide technological improvements over current methods of receiving notifications from an IVA that do not analyze content of the notification to determine the likely relevance of the message to each person proximate to the IVA (e.g., within a household). Contemporary IVAs output each notification that they receive via any output devices (e.g., speaker, display screen) of the IVA. A single IVA may have multiple devices spread throughout a house to provide assistance and messages to members of the household, and messages are output on each of the multiple devices. A disadvantage of contemporary approaches is that multiple people may be disrupted with a notification, when only one (or less than all) of the household members needs to be notified. One or more embodiments of the present invention provide technical solutions to this disadvantage by analyzing incoming notifications to determine which household member(s) should receive the message. When compared to sending a notification to all devices of an IVA, sending the notification to a subset of the household members can result in less network traffic on the IoT network. Additional benefits include that household members are not interrupted with every notification that is sent to an IVA, instead each household member only receives those notifications that are likely to be relevant to them.

One or more embodiments of the present invention provide technological improvements over current methods of receiving notifications from an IVA that do not select a device to output the message and a delivery method based on one or more of a location of the recipient, an activity of the recipient, an environment of the recipient, and a time of day. Contemporary IVAs output each notification that they receive via any of possibly multiple output devices (e.g., speaker, display screen) of the IVA. A disadvantage of contemporary approaches is that an individual may not get the notification. For example, if a person has headphones on and is listening to music, the person may not hear the notification emitted by a speaker of the IVA. One or more embodiments of the present invention provide technical solutions to this disadvantage by analyzing information about the location of the recipient and can select a device and delivery method based on the analysis. When compared to sending all notifications from an IVA device in the same way, customizing the device and delivery method can result in less network traffic on the IoT network due to fewer reminders being needed because the correct person did not receive the notification.

An example of using one or more embodiments of the present invention follows. In this example, Ana's household includes Ana, Brian, and a baby. Ana's mother comes to visit Ana at Ana's house and the baby is sleeping. Ana's mother knocks at the door of Ana's house and a security camera (an IoT device) with a visual recognition engine recognizes that the person at the door is Ana's mother based on historical data and Ana's relationship profile. The security camera sends a message to the IVA in the household, indicating that Ana's mother is at the door. The IVA determines (e.g., via a camera and/or wearable device having GPS) that Ana, Brian, and a baby are in the house and their locations in the house. The IVA analyzes the message using, for example, natural language processing, and the IVA calculates the likelihood of the message being relevant to each of the people in the house. It determines that Ana is the most relevant, followed by Brian. It also identifies that the baby is sleeping (e.g., via a baby monitor that is an IoT device or a wearable IoT device) in the room and should not be awoken by the IVA with this type of message.

Based on determining that Ana should be the recipient of the message, the IVA identifies (e.g., via a mobile device that is an IoT device) that Ana is listening to music with headphones in a studio room in the house. Instead of sharing the message out loud in the house and disturbing the baby or Brian, the IVA sends the message to Ana via her headphones. An IoT device(s) can track that the door has been opened by Ana which can be used as confirmation that Ana has received the message and doesn't require a follow-up or alternatively that Brian does not need to be alerted that Ana's mother is at the door.

Another example of using one or more embodiments of the present invention follows. In this example, Jack's apartment has a tight time window on putting the trash outside (e.g., it needs to be outside between 6 p.m. and 7 p.m.). Jack needs to mow the lawn but doesn't want to miss the window to take out the trash. Jack can tell his IVA "remind me to take the trash out in thirty minutes." Thirty minutes later, the IVA detects that Jack is outside and in a noisy environment, so the IVA alerts him by causing his smart to watch vibrate and to light up. Jack receives the message and goes to take out the trash, not missing the deadline. The IVA tracks that Jack did take out the trash and so does not send a follow-up alert.

Turning now to FIG. 1, a block diagram 100 of components of IVA notification rerouting is generally shown in accordance with one or more embodiments of the present invention. The components shown in FIG. 1 include user historical data 104, message analysis 106, cognitive analytical modeling 108, user context analysis 110, IoT devices 102, processing engine 112, and message delivered 114.

The message analysis 106 can be performed, for example, by natural language processing techniques to parse a notification that is received at an IVA. Any natural language processing techniques can be utilized by one or more embodiments of the present invention. Commercially available tools for performing the natural language processing include but are not limited to Watson™ from IBM; and CoreNLP from Stanford Group.

The results from the message analysis 106 and user historical data 104 are input to cognitive analytic modeling 108. The user historical data 104 can include, for a group of users in proximity to the IVA (e.g., members of a household), but is not limited to: previous messages and actions; and user relationships. The user historical data 104 can be stored storage located on the IVA and/or storage accessed via a network. In addition to the user historical data 104, message routing information that is entered directly into the IVA when the IVA is set-up by a user can also be input to the user cognitive analytic modeling 108. This user entered routing information can include, but is not limited to, interests of each household member, do-not disturb timeframes for each household member, labeled pictures of relatives/friends of each household member. The cognitive analytical modeling 108 calculates the likelihood of user relevance to a message and based on the calculation it selects a recipient for the message. For notifications that are determined to be important (e.g., smoke alarm alert), the cognitive analytical modeling 108 can output a list of recipients in order of likelihood so that if the recipient with the highest likelihood is not available or does not take an expected action, the system sends the notification to the next recipient on the list and so on, until an expected action is taken. The cognitive analytical modeling 108 can be implemented by a commercially available tool such as, but not limited to Watson™ from IBM and TensorFlow Open-source software.

Referring back to the example described above where Ana's mother is at the door of Ana's house, the cognitive analytical modeling 108 can determine that there is a 90% likelihood that Ana should be the recipient of the message that her mother is at the door; a 50% likelihood that Brian should be the recipient, and a 10% likelihood that the baby should be the recipient.

The likelihoods are output from the cognitive analytic modeling 108 and input to a device (e.g., an IVA device) that is in a group of IoT devices 102 in an IoT network. User context analysis 110 is performed to determine, for all or a subset of the users in proximity to the IVA, or the possible recipients, context that can include, but is not limited to: a current environment of the user; a current location of the user; and a current activity of the user. The user context analysis 110 can be performed for all of the possible recipients, or a subset can be selected based on criteria such as, but not limited to, only those possible recipients having a likelihood greater than a user selectable value or for a specified number of users. The user context analysis 110 uses information provided by the IoT devices 102 to perform the context analysis 110. For example, an IoT device may include a camera that uses recognition software to recognize a current location of a possible recipient, and optionally an activity being performed by the possible recipient. The user context analysis 110 can infer an environment (e.g., a noise level, a temperature) based on the location and the activity. Alternatively, or in addition, sensing devices such as, but not limited to thermometers and microphones can be used as input to determining an environment of the possible recipient. When a possible recipient is wearing an IoT device, such as smart watch, the location of the watch can be assumed to the location of the possible recipient or the location can also be verified by other IoT devices 102 (e.g., cameras) if available.

Referring back to the example described above where Ana's mother is at the door of Ana's house, the user context analysis 110 can determine that Ana is listening to music via headphones in her room, that Brian is playing video games in the living room, and that a baby is sleeping in a bedroom.

The processing engine 112 selects an IoT device and delivery method for the message. The processing engine 112 takes into account the current locations of the IoT devices that can be used to output the message (may be a subset of the total IoT devices), the current location of the recipient, a current activity of the recipient and/or a current environment of the recipient to select an IoT device and a delivery method for the notification. In accordance with one or more embodiments of the present invention, the selecting of an IoT device and a delivery method may also take into account the current time of day. The delivery method may include a message to a user screen for notifications in the middle of the night, while the delivery method may include an audio message for notifications in the day time. In addition, an urgency of the message can also be taken into account when selecting the device and delivery method. For example, messages determined (e.g., by the message analysis 106) to have a high importance may be broadcast by all IoT devices having output capability. The processing engine 112 can be implemented by a commercially available tool such as, but not limited to Watson™ from IBM. The processing engine 112 instructs the IoT device to output the message to the recipient using the specified delivery action. This instruction to take an action can be sent to all or a subset of the possible recipients. The message is delivered at block 114.

Referring back to the example described above where Ana's mother is at the door of Ana's house, the processing engine 112 can determine that headphones are the optimal IoT device when sending a notification to Ana, and that the IVA or a television in the living room is the optimal IoT device when sending a notification to Brian. There is no optimal device selected for the baby since the baby is sleeping and should not be woken up. The processing engine 112 shares the message with Ana via her headphones and if Ana doesn't respond, Brian is alerted via the IVA or a television in the living room. In this manner, the message can be sent to the possible recipients in the order of the estimated likelihoods that they should be the recipient of the message.

The processing engine 112 can also verify that the message was delivered. This can be via a confirmation from the recipient or via information obtained from the IoT devices 102. In the above example, an IoT device can detect that the front door was opened by Ana, and this expected action can be used by the processing engine 112 as a confirmation that the message was delivered.

One skilled in the art will recognize that the above are just a few examples of ways that data collected from IoT devices 102 can be used to select an IoT device and a delivery method for a notification from an IVA and embodiments of the invention are not limited to these examples. As households are becoming increasingly automated more IoT devices will be available to the cognitive analytic modeling 108, user context analysis 110, and the processing engine 112. For example, IoTs that indicate that a garage door has been opened can be used to verify that a message was delivered and the requested action was taken, IoT device video cameras coupled with image recognition software can be used to identify an activity or location of a possible recipient, and IoT devices that turn on an oven can be used to verify that a message was delivered and the requested action was taken.

It is to be understood that the block diagram 100 of FIG. 1 is not intended to indicate that all embodiments of the present invention include all of the components shown in FIG. 1. Rather, one or more embodiments of the present invention can include any appropriate fewer or additional components illustration in FIG. 1 (e.g., additional analytics, input data, etc.). Further, the embodiments described herein with respect to FIG. 1 may be implemented by any appropriate logic, wherein the logic, as referred to herein, can include any suitable hardware (e.g., processor, an embedded controller, or an application specific integrated circuit, among others), firmware, or any suitable combination of hardware, software, and firmware, in various embodiments. One or more embodiments of the present invention are implemented using logic located in an IVA device. One or more other embodiments of the present invention are implemented using logic located on a cloud computing node.

Figure 2:
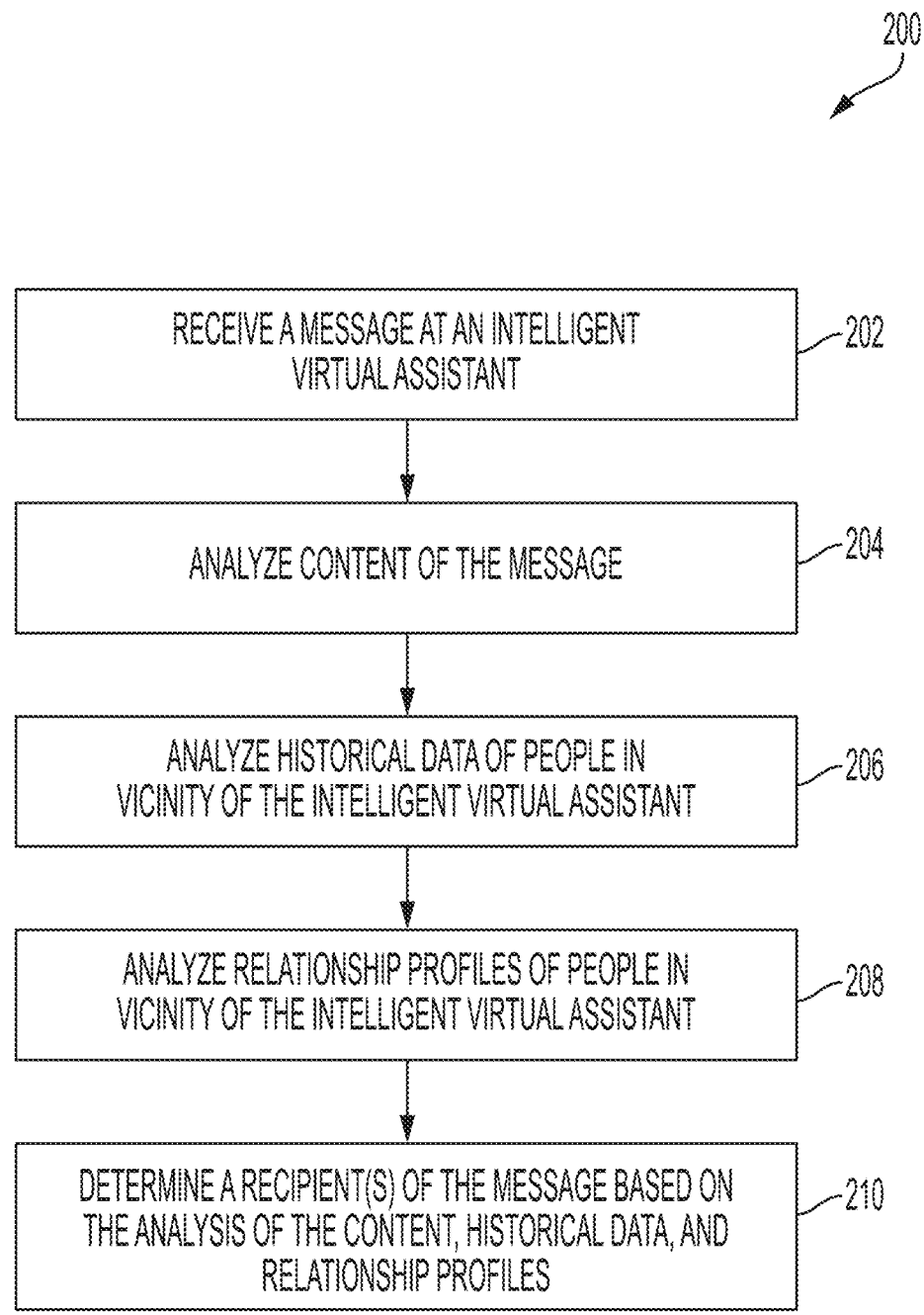
FIG. 2 illustrates a flow diagram of a process for determining which user should review a message in accordance with one or more embodiments of the present invention.

Turning now to FIG. 2, a flow diagram 200 of a process for determining which user should review a message is generally shown in accordance with one or more embodiments of the present invention. The processing shown in FIG. 2 can be used to calculate the probability of which user(s) should receive a message, based on an analysis of message content and user history. The processing shown in FIG. 2 can be performed by a processor located in an IVA device and/or by cloud computing nodes.

At block 202 of FIG. 2, a message is received at an electronic IVA and, at block 204 the content of the message is analyzed using, for example, the message analysis 106 of FIG. 1. At blocks 206 and 208, the historical data and relationship profiles of people in vicinity of the IVA are analyzed using, for example, the cognitive analytical modeling 108 of FIG. 1. At block 210, a recipient(s) of the message is determined based on the analysis of the content, the historical data, and the relationship profiles using, for example, the cognitive analytical modeling 108 of FIG. 1.

The processing flow diagram 200 of FIG. 2 is not intended to indicate that the operations are to be executed in any particular order, or that all of the operations shown in FIG. 2 are to be included in every case. Additionally, the process shown in FIG. 2 can include any suitable number of additional operations.

Figure 3:
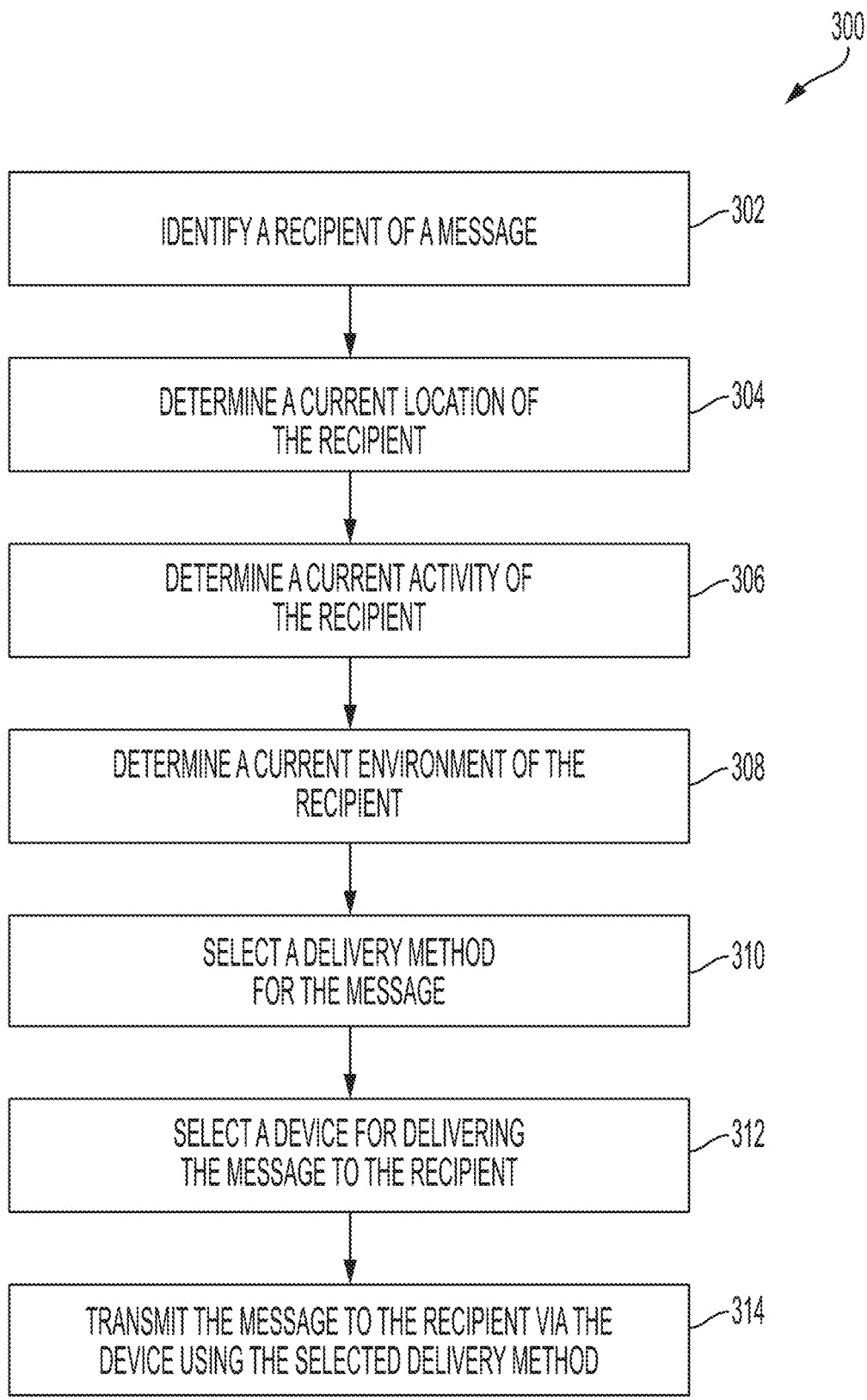
FIG. 3 illustrates a flow diagram of a process for determining how to route a message to a user in accordance with one or more embodiments of the present invention.

Turning now to FIG. 3, a flow diagram 300 of a process for determining how to route a message to a user is generally shown in accordance with one or more embodiments of the present invention. The processing shown in FIG. 3 can be used to select the most appropriate device(s) and delivery method(s) based on the selected recipient(s) location, activity, and environment. The processing shown in FIG. 3 can be performed by a processor located in an IVA device and/or by cloud computing nodes.

At block 302 of FIG. 3, a recipient of the message is identified, in a manner such as that shown in FIG. 2. At block 304, a current location of the recipient is determined using, for example the user context analysis 110 of FIG. 1. At block 306, a current activity of the recipient is determined, and at block 308, a current environment of the recipient is determined. The processing in both blocks 306 and 308 can be performed by the user context analysis 110 of FIG. 1. At block 310, a delivery method is selected and at block 312 a device for delivering the message to the recipient is selected. At block 314, the message is transmitted to the recipient via the selected device using the selected deliver method. The processing in blocks 310, 312, and 314 can be performed for example, using the processing engine 112 of FIG. 1.

The processing flow diagram 300 of FIG. 3 is not intended to indicate that the operations are to be executed in any particular order, or that all of the operations shown in FIG. 3 are to be included in every case. Additionally, the process shown in FIG. 3 can include any suitable number of additional operations.

One or more embodiments of the present invention ensure that the message was received with appropriate follow-up on an incomplete delivery and/or response to requested action(s).

One or more embodiments of the present invention can be used for product recommendations in an IoT marketplace.

One or more embodiments of the present invention can be used to contact multiple users and/or to amplify the sound of a notification if ambient sound conflict is detected.

One or more embodiments of the present invention can be used to improve transmission of communication when interaction is detected with IoT devices within proximity to lower sound levels (e.g., lower television volume).

In accordance with one or more embodiments of the present invention, external IoT devices (e.g., a baby monitor) can be leveraged for determining where disturbances might occur, such as a baby monitor.

In accordance with one or more embodiments of the present invention, a user-specific learning corpus can be customized to allow a user to stop and/or to redirect a message being communicated if they feel that what is being relayed is not appropriate for the audience and/or the delivery method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
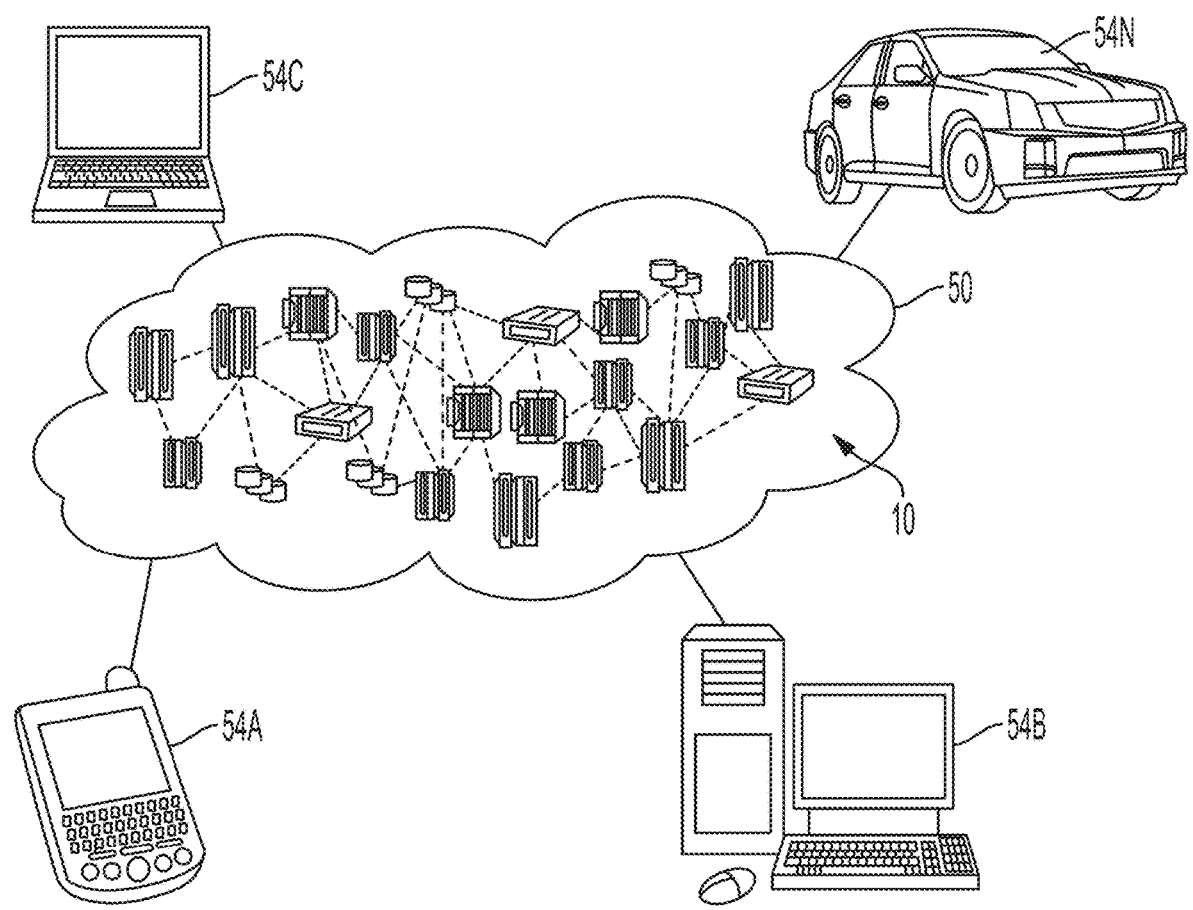
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
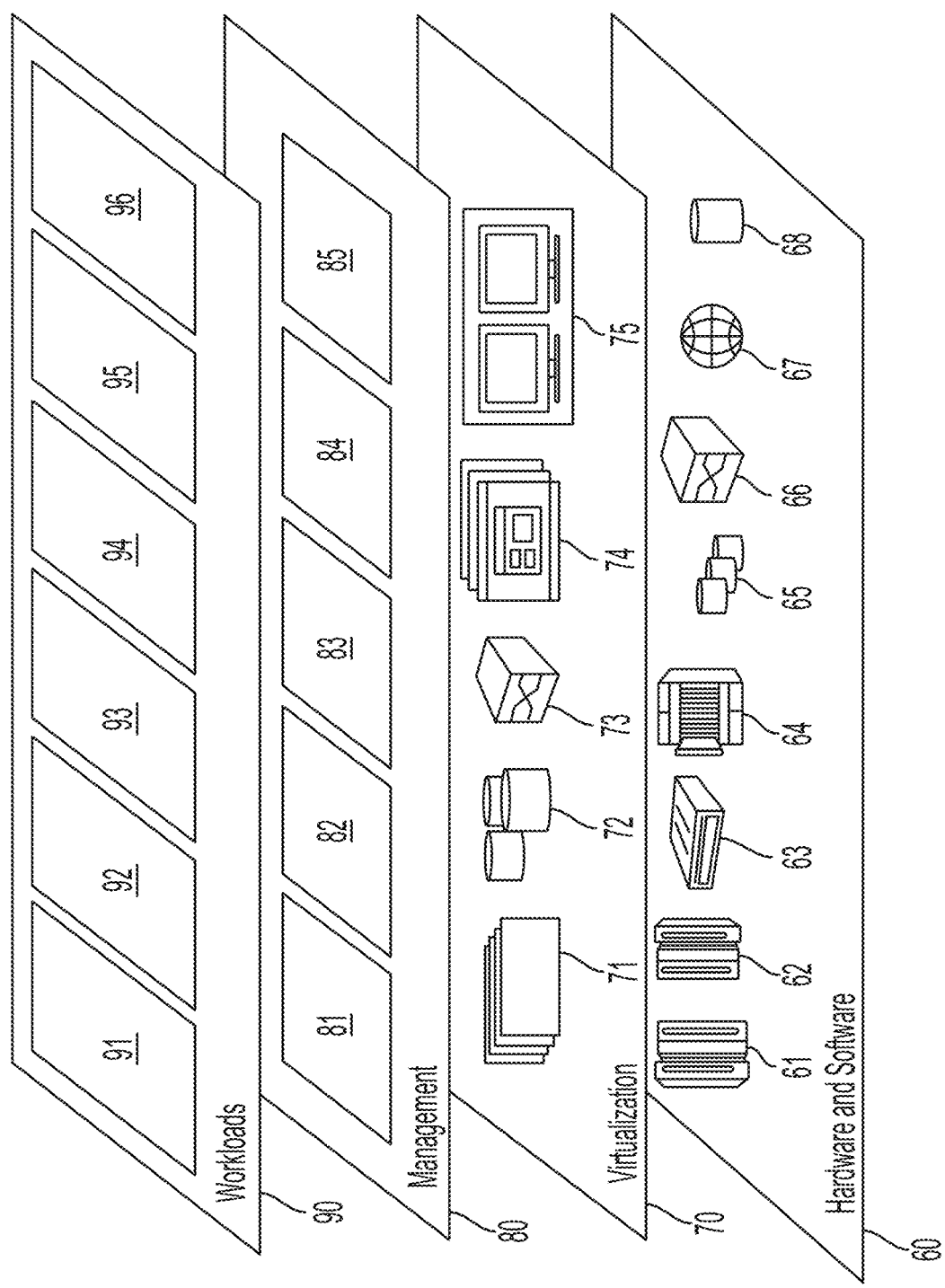
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IVA notification rerouting 96.

Figure 6:
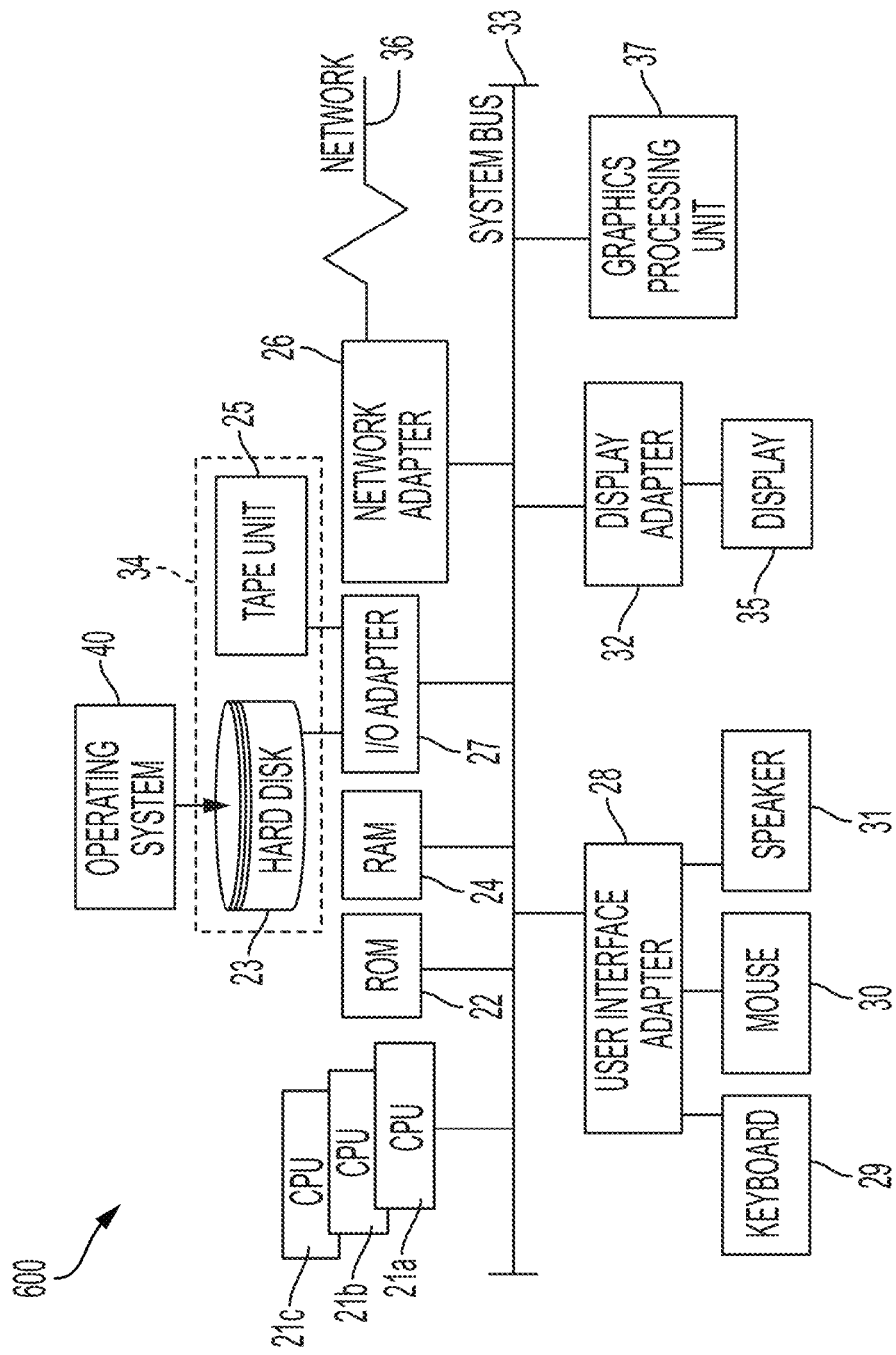
FIG. 6 depicts a processing system for implementing one or more embodiments of the present invention.

It is understood that one or more embodiments of the present invention are capable of being implemented in conjunction with any other type of computing environment now known or later developed. For example, FIG. 6 depicts a block diagram of a processing system 600 for implementing the techniques described herein. In accordance with one or more embodiments of the present invention, system 600 is an example of a cloud computing node 10 of FIG. 4. In the embodiment shown in FIG. 6, processing system 600 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 (21a, 21b, and 21c) are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 600.

Further illustrated are an input/output (I/O adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 600 can be stored in mass storage 34. The RAM 22, ROM 24, and mass storage 34 are examples of memory of the processing system 600. A network adapter 26 interconnects system bus 33 with an outside network 36 enabling the processing system 600 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 600 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 600 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a message at an intelligent virtual assistant (IVA) for broadcast on output devices of the IVA;
   determining a recipient of the message from a group of possible recipients in proximity to the IVA, the determining comprising analyzing content of the message;
   identifying a current location of the recipient;
   selecting a device and a delivery method based at least in part on the current location and an environment of the recipient and on a location of the device, the device one of the output devices of the IVA or another output device, and the environment comprising one or both of a noise level and a temperature; and
   instructing the device to output the message to the recipient using the delivery method.

2. The computer-implemented method of claim 1, wherein the determining further comprises analyzing historical data related to one or more recipients including the recipient.

3. The computer-implemented method of claim 1, wherein the selecting is further based at least in part on an activity of the recipient.

4. The computer-implemented method of claim 1, wherein the selecting is further based at least in part on a current time of day.

5. The computer-implemented method of claim 1, further comprising determining a time frame for the message, wherein the instructing is during the time frame.

6. The computer-implemented method of claim 1, further comprising confirming that the message was received by the recipient.

7. The computer-implemented method of claim 1, further comprising confirming that the recipient performed an expected action in response to receiving the message.

8. The computer-implemented method of claim 1, wherein a second recipient of the message is determined, and the identifying, selecting, and instructing are performed for the second recipient of the message.

9. The computer implemented method of claim 1, wherein the IVA and the device are both connected to an Internet of things (IoT) network.

10. A system comprising:
    a memory having computer readable instructions; and
    one or more processors for executing the computer readable instructions, the computer readable instructions controlling the one or more processors to perform operations comprising:
    receiving a message at an intelligent virtual assistant (IVA) for broadcast on output devices of the IVA;
    determining a recipient of the message from a group of possible recipients in proximity to the IVA, the determining comprising analyzing content of the message;
    identifying a current location of the recipient;
    selecting a device and a delivery method based at least in part on the current location and an environment of the recipient and on a location of the device, the device one of the output devices of the IVA or another output device, and the environment comprising one or both of a noise level and a temperature; and
    instructing the device to output the message to the recipient using the delivery method.

11. The system of claim 10, wherein the determining further comprises analyzing historical data related to one or more recipients including the recipient.

12. The system of claim 10, wherein the selecting is further based at least in part on an activity of the recipient.

13. The system of claim 10, wherein the selecting is further based at least in part on a current time of day.

14. The system of claim 10, further comprising determining a time frame for the message, wherein the instructing is during the time frame.

15. The system of claim 10, further comprising confirming that the message was received by the recipient.

16. The system of claim 10, further comprising confirming that the recipient performed an expected action in response to receiving the message.

17. The system of claim 10, wherein a second recipient of the message is determined, and the identifying, selecting, and instructing are performed for the second recipient of the message.

18. A computer program product comprising a computer readable storage medium having program instructions embodied therewith, the program instructions executable by a processor to cause the processor to perform operations comprising:
- receiving a message at an intelligent virtual assistant (IVA) for broadcast on output devices of the IVA;
- determining a recipient of the message from a group of possible recipients in proximity to the IVA, the determining comprising analyzing content of the message;
- identifying a current location of the recipient;
- selecting a device and a delivery method based at least in part on the current location and an environment of the recipient and on a location of the device, the device one of the output devices of the IVA or another output device, and the environment comprising one or both of a noise level and a temperature; and
- instructing the device to output the message to the recipient using the delivery method.

* * * * *